(12) United States Patent
Kobana et al.

(10) Patent No.: US 9,707,973 B2
(45) Date of Patent: Jul. 18, 2017

(54) DRIVE ASSIST DEVICE

(75) Inventors: Masumi Kobana, Fuji (JP); Shinichi Nagata, Yokohama (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 14/408,359

(22) PCT Filed: Jul. 24, 2012

(86) PCT No.: PCT/JP2012/068727
§ 371 (c)(1),
(2), (4) Date: Dec. 16, 2014

(87) PCT Pub. No.: WO2014/016911
PCT Pub. Date: Jan. 30, 2014

(65) Prior Publication Data
US 2015/0203126 A1    Jul. 23, 2015

(51) Int. Cl.
*B60W 50/12* (2012.01)
*B60W 30/12* (2006.01)
(Continued)

(52) U.S. Cl.
CPC ............ *B60W 50/12* (2013.01); *B60K 28/06* (2013.01); *B60K 28/066* (2013.01); *B60W 30/12* (2013.01);
(Continued)

(58) Field of Classification Search
CPC .. B60W 50/12; B60W 50/087; B60W 30/143; B60W 30/12; B60W 2540/10;
(Continued)

(56) References Cited

U.S. PATENT DOCUMENTS 8,725,311 B1 *  5/2014  Breed .................... G08B 21/06
                                                                   600/300
2002/0130550 A1   9/2002  Roden et al.
(Continued)

FOREIGN PATENT DOCUMENTS

JP         6-107031 A      4/1994
JP      2003-63373 A      3/2003
(Continued)

OTHER PUBLICATIONS

Communication from United States Patent and Trademark Office issued Aug. 15, 2016 in U.S. Appl. No. 14/408,367.

*Primary Examiner* — Nga X Nguyen
(74) *Attorney, Agent, or Firm* — Sughrue Mion, PLLC

(57) ABSTRACT

Disclosed is a drive assist device including: a driver state detection unit that outputs a control start signal; a consent confirmation unit that inquires of a driver, whether the driver consents to execution of an emergency evacuation control, and receives a reply to the inquiry from the driver; a control section that executes the emergency evacuation control when receiving a consent reply of the execution of the emergency evacuation control from the driver; and an erroneous operation determination unit that determines whether the driving operation of the driver is an erroneous operation, in which the control section limits the driving operation of the driver when it is determined that the driving operation of the driver is an erroneous operation in a period from the time when the control start signal is received to the time when the consent reply of execution of the control is received.

17 Claims, 15 Drawing Sheets

(51) Int. Cl.
    *B60W 30/14*     (2006.01)
    *B60W 50/08*     (2012.01)
    *B60K 28/06*     (2006.01)
    *B60W 50/00*     (2006.01)
    *B60W 50/14*     (2012.01)

(52) U.S. Cl.
    CPC ........ *B60W 30/143* (2013.01); *B60W 50/087* (2013.01); *B60W 2050/0074* (2013.01); *B60W 2050/143* (2013.01); *B60W 2540/10* (2013.01); *B60W 2540/106* (2013.01); *B60W 2540/165* (2013.01); *B60W 2540/18* (2013.01); *B60W 2540/22* (2013.01); *B60W 2540/26* (2013.01)

(58) Field of Classification Search
    CPC ....... B60W 2540/26; B60W 2540/106; B60W 2540/18; B60W 2540/22; B60W 2050/0074; B60W 2050/143; B60W 2540/165; B60K 28/066; B60K 28/06
    USPC ................................ 701/1, 93; 600/300, 529
    See application file for complete search history.

(56) References Cited

U.S. PATENT DOCUMENTS

| | | |
|---|---|---|
| 2004/0090320 A1 | 5/2004 | Suzuki et al. |
| 2005/0261806 A1 | 11/2005 | Canie et al. |
| 2008/0281521 A1 | 11/2008 | Shirato |
| 2010/0073194 A1 | 3/2010 | Ghazarian |
| 2010/0318271 A1 | 12/2010 | Nishide et al. |
| 2011/0313259 A1 | 12/2011 | Hatakeyama et al. |
| 2012/0022764 A1* | 1/2012 | Tang ..................... B60W 10/06 701/102 |
| 2012/0226423 A1 | 9/2012 | Sekiguchi |
| 2012/0283927 A1 | 11/2012 | Reinisch et al. |
| 2013/0235047 A1 | 9/2013 | Xia et al. |
| 2014/0121927 A1* | 5/2014 | Hanita ..................... B60T 7/14 701/70 |
| 2014/0222286 A1* | 8/2014 | Chundrlik, Jr. ... B60W 50/0098 701/36 |
| 2014/0333467 A1 | 11/2014 | Inomata |
| 2015/0191176 A1 | 7/2015 | Kobana et al. |

FOREIGN PATENT DOCUMENTS

| | | |
|---|---|---|
| JP | 2006-224819 A | 8/2006 |
| JP | 2007-331652 A | 12/2007 |
| JP | 2010-20637 A | 1/2010 |
| JP | 2010-36656 A | 2/2010 |
| JP | 2010-286096 A | 12/2010 |
| JP | 2011-238130 A | 11/2011 |

\* cited by examiner

Fig.3

| ENVIRONMENT | DRIVING OPERATION | | | | | | |
|---|---|---|---|---|---|---|---|
| | BRAKE | ACCELERATOR | STEERING | DRIVE ASSIST SWITCH OFF | PARKING BRAKE | SHIFT | BLINKER HAZARD |
| IN INTERSECTION | ○ | ○ | ○ | × | × | × | △ |
| VICINITY OF INTERSECTION | ○ | ○ | ○ | × | △ | △ | △ |
| ROAD SECTION OF UNINTERRUPTED FLOW | ○ | ○ | ○ | × | ○ | ○ | △ |

Fig. 4
(a)
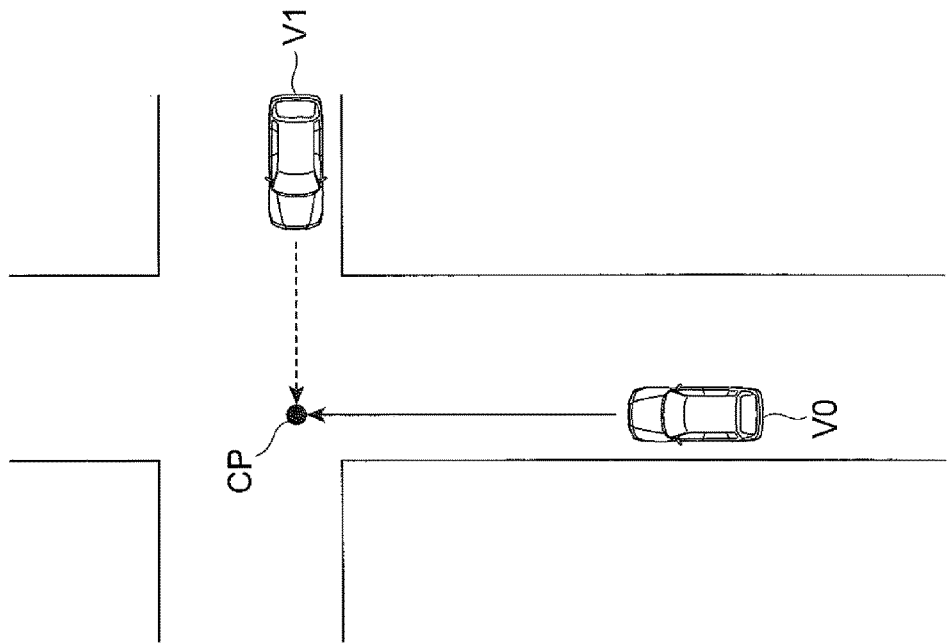
(b)
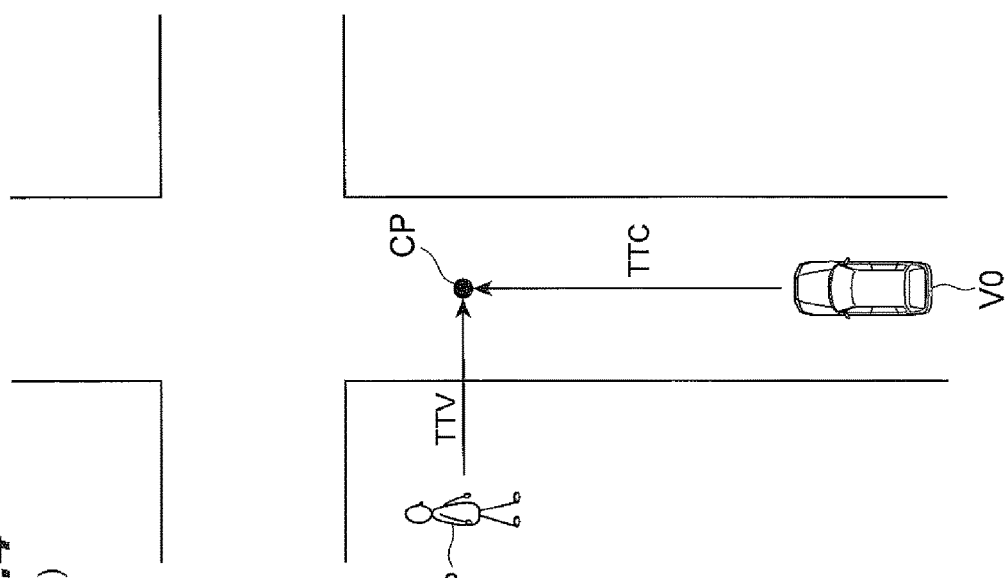

Fig. 8
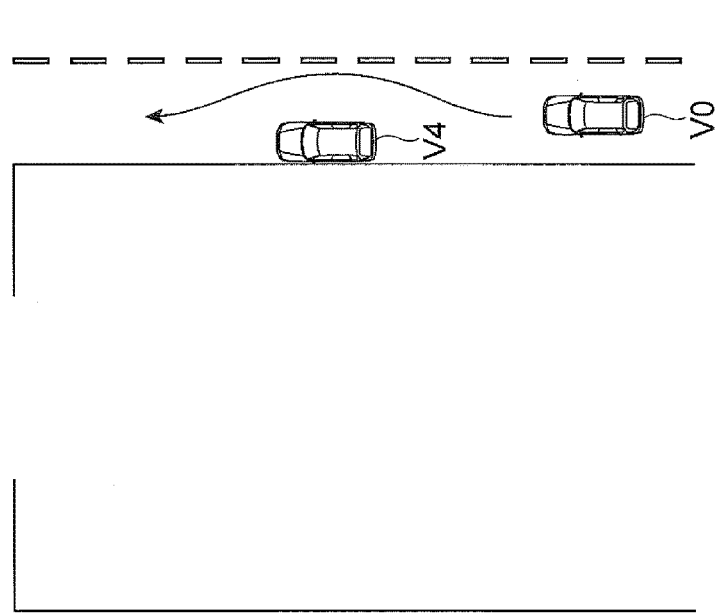
(b)
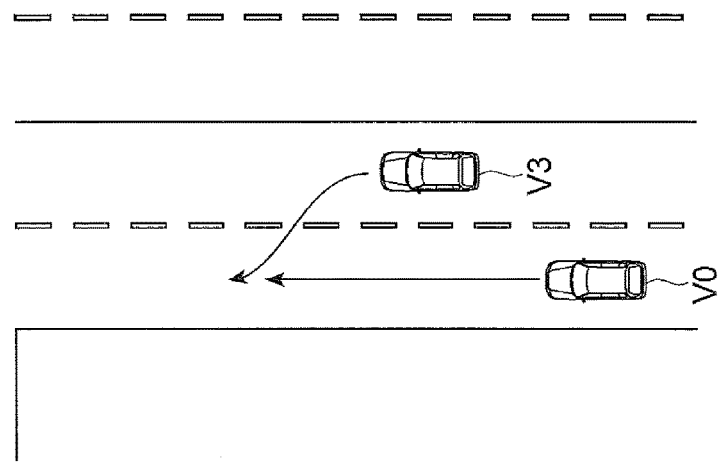
(a)

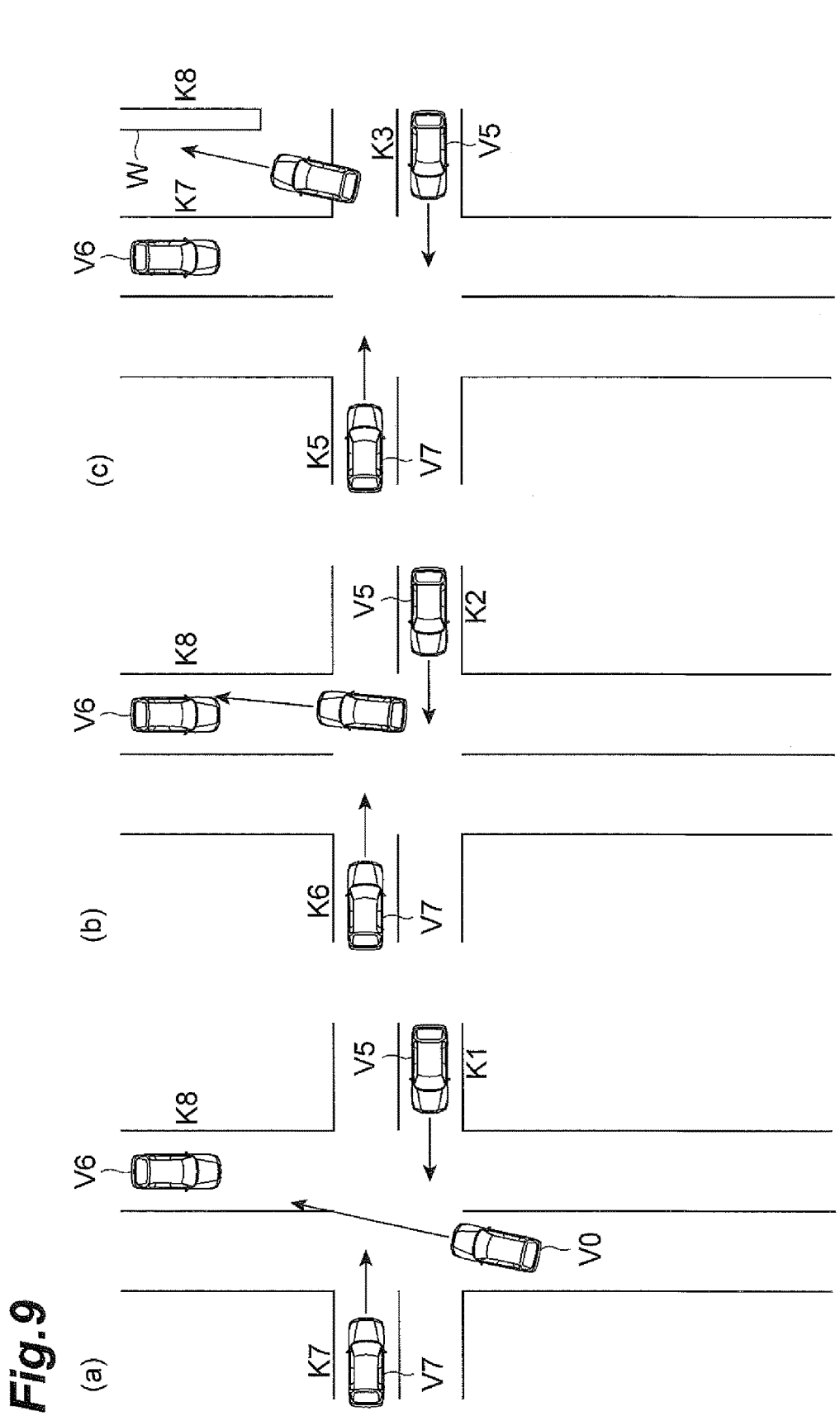

*Fig.10*

| DEGREE OF RISK | NOTIFICATION STATE |
|---|---|
| HIGH | NOTIFICATION IN ALL DIRECTIONS SUCH AS FRONT REAR, OPPOSITE SIDE, REAR LATERAL SIDE AND INTERSECTION SIDE<br>　・PATROL LAMP, SOUND, AND THE LIKE<br>　・HAZARD+BRAKE LAMP FLICKERING, OR THE LIKE |
| INTERMEDIATE | NOTIFICATION TOWARD FRONT REAR, REAR LATERAL SIDE, OPPOSITE SIDE, OR INTERSECTION SIDE<br>FRONT REAR<br>　・HAZARD+BRAKE LAMP FLICKERING, OR THE LIKE<br>OPPOSITE SIDE<br>　・HIGH BEAM FLICKERING OR THE LIKE<br>INTERSECTION SIDE<br>　・PATROL LAMP FLICKERING OR THE LIKE |
| LOW | NOTIFICATION TOWARD REAR OR REAR LATERAL SIDE<br>　・BRAKE LAMP FLICKERING OR THE LIKE |

Fig.13
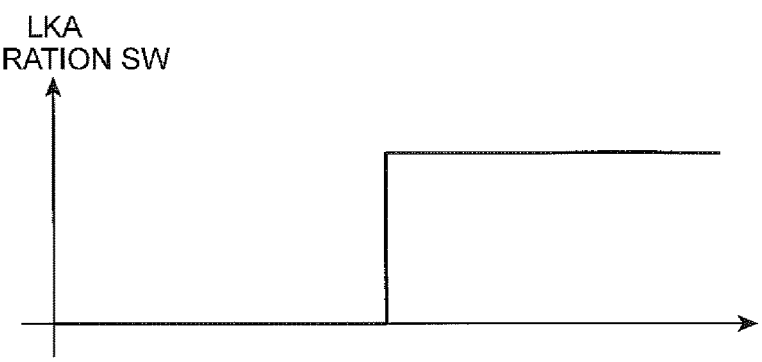
(a) LKA OPERATION SW
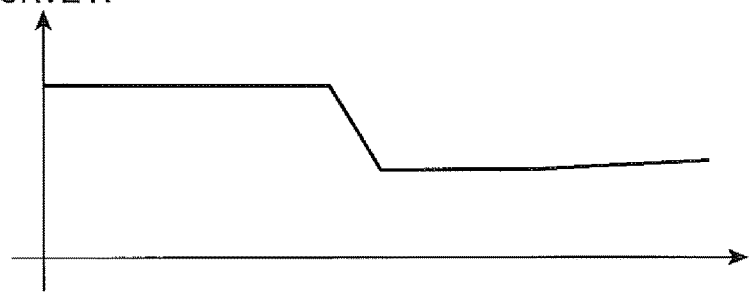
(b) CURVE R
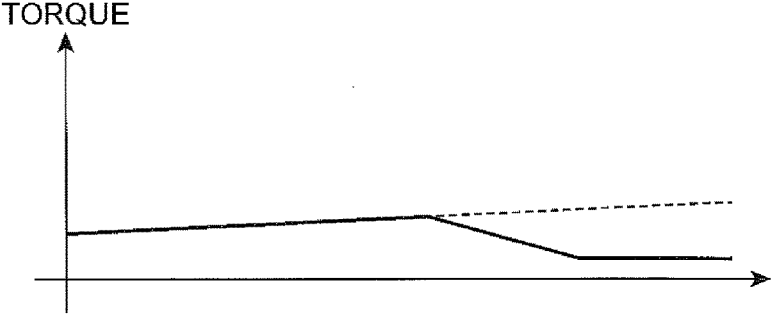
(c) TORQUE
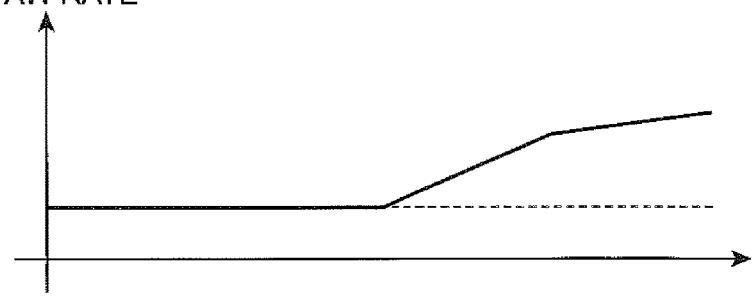
(d) SLIDE G/YAW RATE Fig.14
(a) VSC RELEASE SW
(b) CURVE R
(c) SLIDE G
(d) YAW RATE
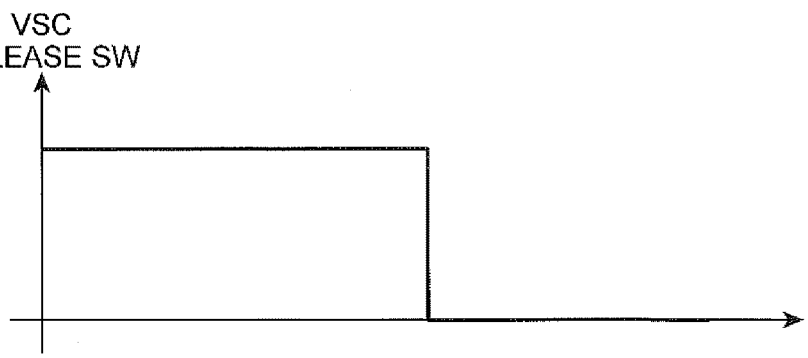
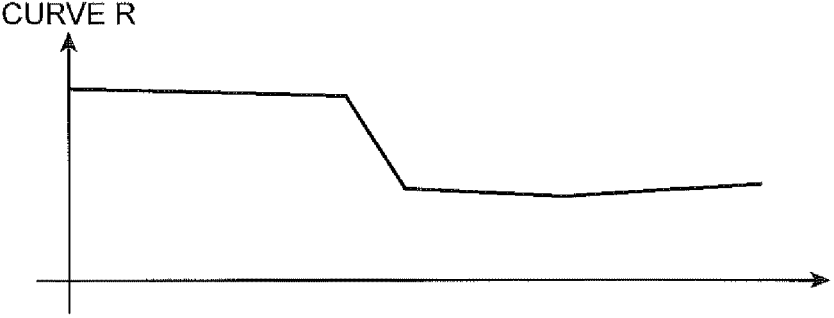
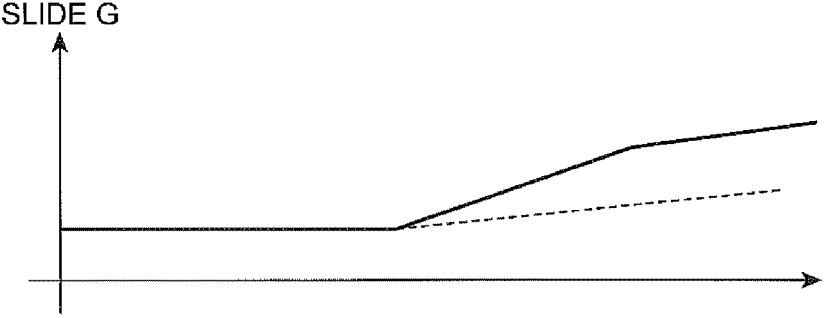
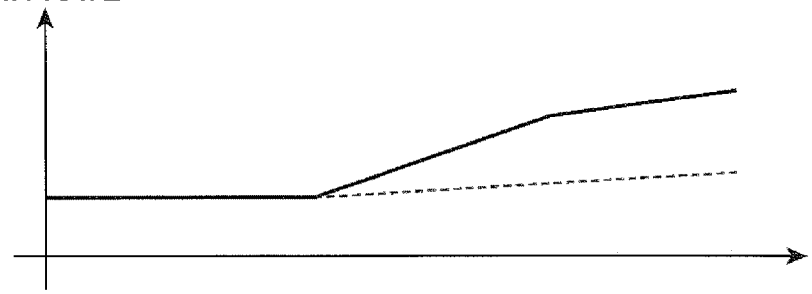

DRIVE ASSIST DEVICE

CROSS REFERENCE TO RELATED APPLICATIONS

This application is a National Stage of International Application No. PCT/JP2012/068727 filed Jul. 24, 2014, the contents of all of which are incorporated herein by reference in their entirety.

TECHNICAL FIELD

The present relates to a drive assist device that assists a driver when driving.

BACKGROUND ART

A device is known that forcibly stops a vehicle in a place where the vehicle causes no obstruction to traffic of other vehicles when detecting a decline in consciousness of a driver. For example, Patent Literature 1 discloses a device that, when detecting a decline in consciousness of a driver during traveling, detects front side road circumstance conditions to determine a target stop position, and automatically controls the vehicle by a steering angle control and a brake control to the target stop position for emergency evacuation.

CITATION LIST

Patent Literature

[Patent Literature 1] Japanese Unexamined Patent Application Publication No. 2007-331652

SUMMARY OF INVENTION

Technical Problem

As in the device disclosed in Patent Literature 1, when leading the vehicle into the emergency evacuation, a technique of executing an emergency evacuation control on condition that the consent to execution of the emergency evacuation control is obtained from the driver may be considered. However, in this case, there is a concern that the driver performs a dangerous operation such as an erroneous operation before the consent of the driver is obtained after the consciousness of the driver starts to decline. In this case, the behavior of the vehicle due to the driving operation may cause uneasiness in drivers of peripheral vehicles.

Thus, an object of the invention is to provide a technique that prevents the behavior of the vehicle from causing uneasiness in the drivers of the peripheral vehicles before the consent of the driver for execution of the emergency evacuation control is obtained.

Solution to Problem

According to an aspect of the invention, there is provided a drive assist device including: a start signal output unit that outputs a control start signal; a consent confirmation unit that inquires of a driver, when receiving the control start signal from the start signal output unit, whether the driver consents to execution of an emergency evacuation control for stopping a vehicle at a safe position regardless of a driving operation of the driver, and receives a reply to the inquiry from the driver; a control section that executes the emergency evacuation control when receiving a consent reply of the execution of the emergency evacuation control from the driver by the consent confirmation unit; and an erroneous operation determination unit that determines whether the driving operation of the driver is an erroneous operation, in which the control section limits the driving operation of the driver when it is determined that the driving operation of the driver is an erroneous operation by the erroneous operation determination unit in a period from the time when the control start signal is received by the start signal output unit to the time when the consent reply of execution of the control is received by the consent confirmation unit.

In the drive assist device according to the aspect of the invention, the driving operation of the driver is limited when it is determined that the driving operation of the driver is an erroneous operation by the erroneous operation determination unit in the period from the time when the control start signal is received by the start signal output unit to the time when the consent reply of execution of the control is received by the reply reception unit. Thus, the execution of an erroneous operation is limited even when the driver performs an erroneous operation, and consequently, uneasiness in drivers in peripheral vehicles caused by the behavior of the vehicle can be prevented.

Further, in the drive assist device according to the aspect of the invention, the control section may nullify the driving operation of the driver when it is determined that the driving operation of the driver is an erroneous operation by the erroneous operation determination unit.

According to such a configuration, since an erroneous operation of the driver is nullified when it is determined that the operation of the driver is an erroneous operation, uneasiness in drivers in peripheral vehicles caused by the behavior of the vehicle due to an erroneous operation of the drivercan be prevented.

In addition, in the drive assist device according to the aspect of the invention, the erroneous operation determination unit may determine, when a temporal change of a steering angle of steering performed by the driver is equal to or greater than a predetermined value, indicating that a steering operation of the driver is an erroneous operation.

According to such a configuration, a sudden steering operation considered as an unusual behavior of the driver can be determined as an erroneous operation.

In addition, in the drive assist device according to the aspect of the invention, the erroneous operation determination unit may determine, when a temporal change of throttle opening performed by the driver is equal to or greater than a predetermined value, indicating that an accelerating operation of the driver is an erroneous operation.

According to such a configuration, a sudden accelerating operation considered as an unusual behavior of the driver can be determined as an erroneous operation.

In addition, in the drive assist device according to the aspect of the invention, the erroneous operation determination unit may determine that an operation of changing a shift lever to a state other than a parking range while the vehicle is being stopped is an erroneous operation.

According to such a configuration, a shift operation considered as an unusual behavior of the driver can be determined as an erroneous operation.

In addition, in the drive assist device according to the aspect of the invention, the erroneous operation determination unit may determine that an operation of changing a shift lever to a state other than a traveling range while the vehicle is traveling is an erroneous operation.

According to such a configuration, a shift operation considered as an unusual behavior of the driver can be determined as an erroneous operation.

In addition, the drive assist device according to the aspect of the invention may further include a drive assist unit that performs a drive assist for assisting traveling of the vehicle, in which the drive assist unit may be configured to switch an operation and a release of the drive assist, the erroneous operation determination unit may determine whether the operation of the drive assist by the driver is an erroneous operation, and the control section may nullify the operation when it is determined that the operation is an erroneous operation by the erroneous determination unit.

According to the driving assist, if the driver operates the vehicle when the driver cannot drive the vehicle normally, it may cause a dangerous situation. According to such a configuration, since it is determined whether the operation of the drive assist of the driver is an erroneous operation, the dangerous drive assist operation can be detected.

In addition, in the drive assist device according to the aspect of the invention, the drive assist may be a constant speed traveling control, and the erroneous operation determination unit may determine that an operation of the constant speed traveling control is an erroneous operation when the operation of the constant speed traveling control is performed by the driver in the period from the time when the control start signal is received by the start signal output unit to the time when the consent reply of the execution of the control is received by the consent confirmation unit.

If the driver operates the constant speed traveling control when the driver cannot drive the vehicle normally, the vehicle may accelerate, which is inappropriate. According to such a configuration, it can be detected if the driver operates the constant speed traveling control by an erroneous operation.

In addition, in the drive assist device according to the aspect of the invention, the drive assist may be a lane keeping assist control, and the erroneous operation determination unit may determine that an operation of the lane keeping assist control is an erroneous operation when the operation of the lane keeping assist control is performed by the driver in the period from the time when the control start signal is received by the start signal output unit to the time when the consent reply of the execution of the control is received by the consent confirmation unit.

If the driver operates the lane keeping assist control when the driver cannot drive the vehicle normally, the vehicle continuously travels, which is inappropriate. According to such a configuration, it can be detected if the driver operates the lane keeping assist control by an erroneous operation.

In addition, the drive assist device according to the aspect of the invention may further include a drive assist unit that performs a drive assist for assisting traveling of the vehicle, in which the drive assist unit may be configured to switch an operation and a release of the drive assist, the erroneous operation determination unit may determine whether the release of the drive assist by the driver is an erroneous operation, and the control section may nullify the release when it is determined that the release is an erroneous operation through the erroneous determination unit.

According to the driving assist, if the driver performs a release when the driver cannot drive the vehicle normally, it may cause a dangerous situation. According to such a configuration, since it is determined whether the release of the drive assist of the driver is an erroneous operation, a dangerous drive assist operation can be detected.

In addition, the drive assist device according to the aspect of the invention may further include a traveling information acquisition unit that acquires traveling information of the vehicle; an environmental information acquisition unit that acquires environmental information relating to a peripheral environment of the vehicle; and a risk degree acquisition unit that acquires the degree of risk of colliding with an obstacle based on at least one of the traveling information and the environmental information, in which the control section may nullify a part of the driving operation when the degree of risk is higher than a predetermined value.

According to such a configuration, since the part of the driving operation is nullified when the degree of risk of colliding with the obstacle is high, uneasiness in drivers in peripheral vehicles caused by the behavior of the vehicle due to the erroneous operation of the driver or the like, in the period from the time when the control start signal is received to the time when the consent of the driver is acquired, can be reliably prevented.

Advantageous Effects of Invention

According to the aspect of the invention, uneasiness in drivers in peripheral vehicles due to the behavior of the vehicle until the driver's consent of execution of the emergency evacuation control is acquired can be reliably prevented.

BRIEF DESCRIPTION OF DRAWINGS

FIG. 3 is a diagram illustrating an example of a determination map.

FIG. 4 is a diagram illustrating an example of a calculation method of a proximity degree parameter r.

FIG. 8 is a diagram illustrating an example of further still another calculation method of the proximity degree parameter r.

FIG. 9 is a diagram illustrating an example of a calculation method of an obstacle parameter k.

FIG. 10 is a diagram illustrating a notification mode according to the degree of risk.

FIG. 13 is a diagram illustrating change in torque and yaw rate of a host vehicle when the operation of LKA is permitted, and change in the torque and the yaw rate of the host vehicle when the operation of the LKA is nullified.

FIG. 14 is a diagram illustrating change in lateral acceleration and a yaw rate of a host vehicle when a release operation of VSC is permitted, and change in the lateral acceleration and the yaw rate of the host vehicle when the release operation of the VSC is nullified.

DESCRIPTION OF EMBODIMENTS

Hereinafter, preferred embodiments of the invention will be described with reference to the accompanying drawings. In the following description, the same reference signs are assigned to the same or corresponding components, and repetitive description will be omitted.

First Embodiment

Figure 1:
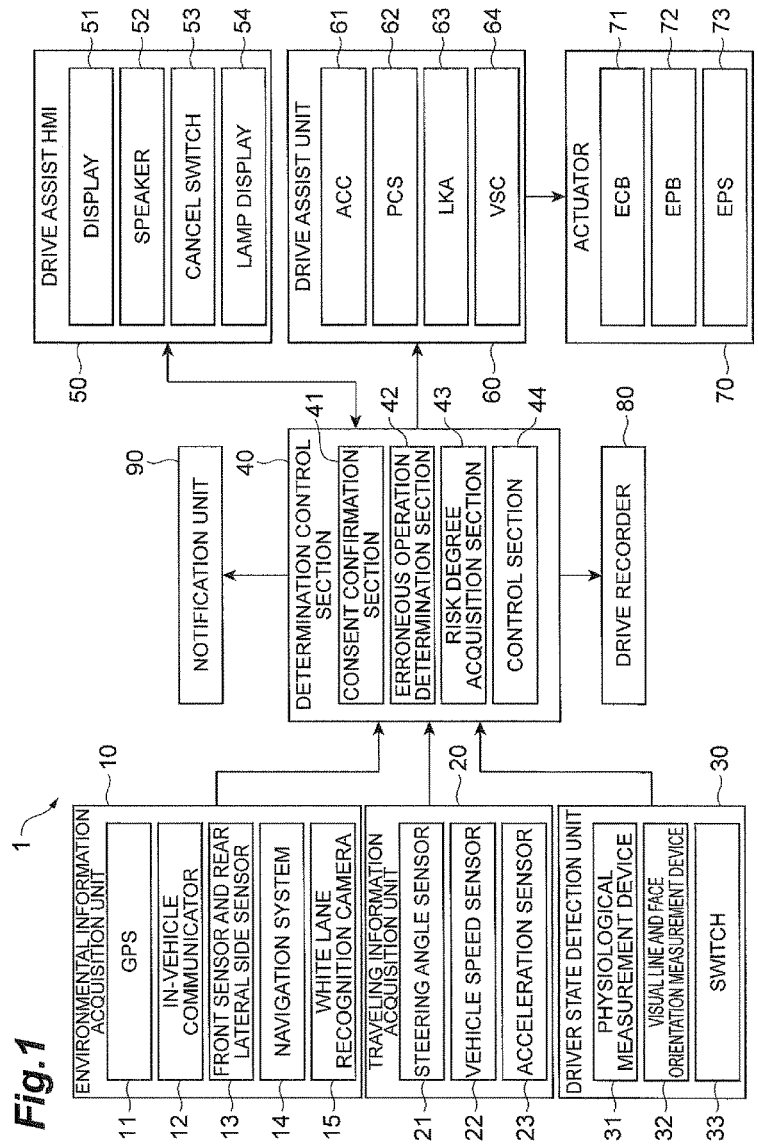
FIG. 1 is a block configuration diagram of a drive assist device according to an aspect of the invention.

FIG. 1 is a block diagram illustrating a functional configuration of a drive assist device 1 according to a first embodiment of the invention. As shown in FIG. 1, the drive assist device 1 includes an environmental information acquisition unit 10, a traveling information acquisition unit 20, a driver state detection unit (start signal output unit) 30, a determination control section 40, a drive assist human machine interface (HMI) 50, a drive assist unit 60, an actuator 70, a drive recorder 80, and a notification unit 90. The drive assist device 1 is mounted in a host vehicle.

The environmental information acquisition unit 10 includes a global positioning system (GPS) 11, an in-vehicle communicator 12, front and rear lateral side sensors 13, a navigation system 14, and a white lane recognition camera 15. The GPS 11 is means for receiving signals from plural GPS satellites by a GPS receiver, and positioning the position of the host vehicle from a difference of the received signals. The in-vehicle communicator 12 is a communicator that performs vehicle-to-vehicle communication with another vehicle or road-to-vehicle communication with road side infrastructure such as an optical beacon. The front and rear lateral side sensors 13 are means for detecting the position and movement velocity of an obstacle such as a pedestrian, a bicycle, a two-wheeled vehicle, a vehicle and a road side facility around the vehicle, which is a millimeter wave radar or an ultrasonic sonar, for example. The navigation system 14 is means for guiding a route using positional information of the host vehicle acquired by the GPS 11 and map information stored in a predetermined storage unit. The white lane recognition camera 15 is means for recognizing a white lane of the lane in which the host vehicle is traveling by image capturing means mounted on the host vehicle. The environmental information acquisition unit 10 outputs environmental information relating to the peripheral environment of the vehicle detected by the GPS 11, the in-vehicle communicator 12, the front and rear lateral side sensors 13, the navigation system 14, and the white lane recognition camera 15 to the determination control section 40.

The traveling information acquisition unit 20 includes a steering angle sensor 21, a vehicle speed sensor 22, and an acceleration sensor 23. The steering angle sensor 21 is a sensor for detecting a steering angle of the host vehicle. The vehicle speed sensor 22 is a sensor for detecting the speed of the host vehicle by detecting the rotation speed of an axle. The acceleration sensor 23 is a sensor for detecting the acceleration of the host vehicle in the longitudinal direction or the lateral direction. The traveling information acquisition unit 20 outputs the traveling information detected by the steering angle sensor 21, the vehicle speed sensor 22, and the acceleration sensor 23 to the determination control section 40.

The driver state detection unit 30 is means for recognizing the state of the driver of the host vehicle. The driver state detection unit 30 detects whether the driver of the host vehicle is losing consciousness due to dozing, seizures or the like. The driver state detection unit 30 includes a physiological measurement device (consciousness level acquisition unit) 31, a visual line and face orientation measurement device (consciousness level acquisition unit) 32, and a switch 33. The physiological measurement device 31 is means for measuring heart rate, pulse rate, and breathing rhythm and the like of the driver of the host vehicle in order to detect the driver state. The visual line and face orientation measurement device 32 is means for image-capturing a head portion of the driver with a camera and detecting the eyeballs, the movement of the face and the like to detect a visual line and a face orientation of the driver. When the decline in consciousness of the driver is detected by the physiological measurement device 31 and the visual line and face orientation measurement device 32, the driver state detection unit 30 outputs an emergency evacuation start signal (control start signal) indicating the start of an emergency control process to the determination control section 40. The driver state detection unit 30 may detect the driver state using an arbitrary method such as a method of detecting variation of the steering angle by the driver.

The switch 33 is a switch operated by the driver for starting the emergency evacuation control using the drive assist device 1. If the switch 33 is pressed by the driver and turned on, the driver state detection unit 30 outputs the emergency evacuation start signal indicating the start of the emergency control process to the determination control section 40. The driver state detection unit 30 may acquire the driver's intention and execute the emergency evacuation control by an arbitrary method such as a method of detecting a sound issued by the driver using a microphone or the like to request execution of the emergency evacuation to output the emergency evacuation start signal. The driver state detection unit 30 forms a start signal output unit to be described in claims.

The determination control section 40 is means for collectively controlling the drive assist device 1 to execute the emergency evacuation device and defensive drive assist, and includes a consent confirmation section 41, an erroneous operation determination section 42, a risk degree acquisition section 43, and a control section 44. When receiving the emergency evacuation start signal from the driver state detection unit 30, the consent confirmation section 41 outputs an inquiry signal for inquiring whether the driver consents to the execution of the emergency evacuation control to the drive assist HMI 50. The erroneous operation determination section 42 is means for determining whether the drive operation performed by the driver is an erroneous operation based on the environmental information output from the environmental information acquisition unit 10 and the traveling information output from the traveling information acquisition unit 20. The risk degree acquisition section 43 is means for acquiring the degree of risk of colliding with an obstacle such as another vehicle or a structure based on the environmental information output from the environmental information acquisition unit 10 and the traveling information output from the traveling information acquisition unit 20. The control section 44 is means for executing, when receiving a reply indicating the consent of the emergency evacuation control from the driver, the emergency evacuation control. The emergency evacuation control refers to a control for stopping the vehicle at a safe position regardless of the driving operation of the driver. Further, the control section 44 alleviates a condition for executing the defensive driving assist for assisting the traveling of the vehicle in a time period from the time when the emergency evacuation start signal is received from the driver state detection unit 30 to the time when the consent reply of the execution of the emergency evacuation control from the driver is received (hereinafter, referred to as a "standby time period").

The drive assist HMI 50 includes a display 51, a speaker 52, a cancel switch 53, and a lamp display 54. When receiving the inquiry signal from the determination control section 40, the drive assist HMI 50 notifies the driver that the emergency evacuation control is to be executed using an image on the display 51, a sound from the speaker 52, the lamp display 54, or the like to inquire whether the driver consents to execution of the emergency evacuation control. If the driver sends a reply indicating consent of the execution of the emergency evacuation control by pressing the switch 33, for example, the drive assist HMI 50 outputs a consent signal indicating the consent of the execution of the emergency evacuation control to the determination control section 40. Further, if the cancel switch 53 is operated by the driver, the execution of emergency evacuation control is cancelled. The drive assist HMI 50 may output the consent signal to the determination control section 40, for example, when the driver sends the reply indicating the consent of the execution of the emergency evacuation control using voice or when there is not a reply from the driver for a predetermined time, after inquiring whether the driver consents to the execution of the emergency evacuation control. Further, the drive assist HMI 50 may cancel the execution of the emergency evacuation control when the driver continuously presses the switch 33 several times after inquiring whether the driver consents to the execution of the emergency evacuation control. The consent confirmation section 41 and the drive assist HMI 50 form a consent confirmation unit to be described in claims.

The drive assist unit 60 is means for executing the defensive driving assist for assisting the traveling of the vehicle based on the control signal from the determination processing ECU 40. The drive assist unit 60 includes an adaptive cruise control (ACC) 61, a pre-crush safety (PCS) 62, a lane keeping assist (LKA) 63, and a vehicle stability control (VSC) 64. The ACC 61 functions as a constant speed traveling control device that allows the host vehicle to travel at a predetermined speed with respect to a preceding vehicle, and as an inter-vehicle distance control device that allows the host vehicle to perform following traveling at a predetermined inter-vehicle distance with respect to the preceding vehicle. The PCS 62 functions as a collision avoidance assist device that allows the host vehicle to avoid collision with the obstacle. The LKA 63 functions as a lane keeping assist device that allows the host vehicle to keep in the lane for traveling. The VSC 64 functions as a sideslip prevention control device that suppresses sideslip of the vehicle. The drive assist unit 60 drives an actuator 70 including an electric control braking system (ECB) 71, an electronic parking brake (EPB) 72, and an electric power steering 73 so as to perform such a drive assist.

The drive recorder 80 is means for recording the states of inside of the vehicle before and after collision. The drive recorder 80 records states of passengers, behaviors of the driver (for example, the presence or absence of drowsy driving or inattentive driving), operation situations of the drive assist HMI 50, and the like before and after collision using a camera or the like.

The notification unit 90 is means for notifying other vehicles around the vehicle of the risk, and physically includes a horn, a hazard lamp, a headlight, and the like. If the emergency evacuation start signal is received from the driver state detection unit 30, the notification unit 90 is controlled by the control section 40 to notify other vehicles around the host vehicle of the risk.

Figure 2:
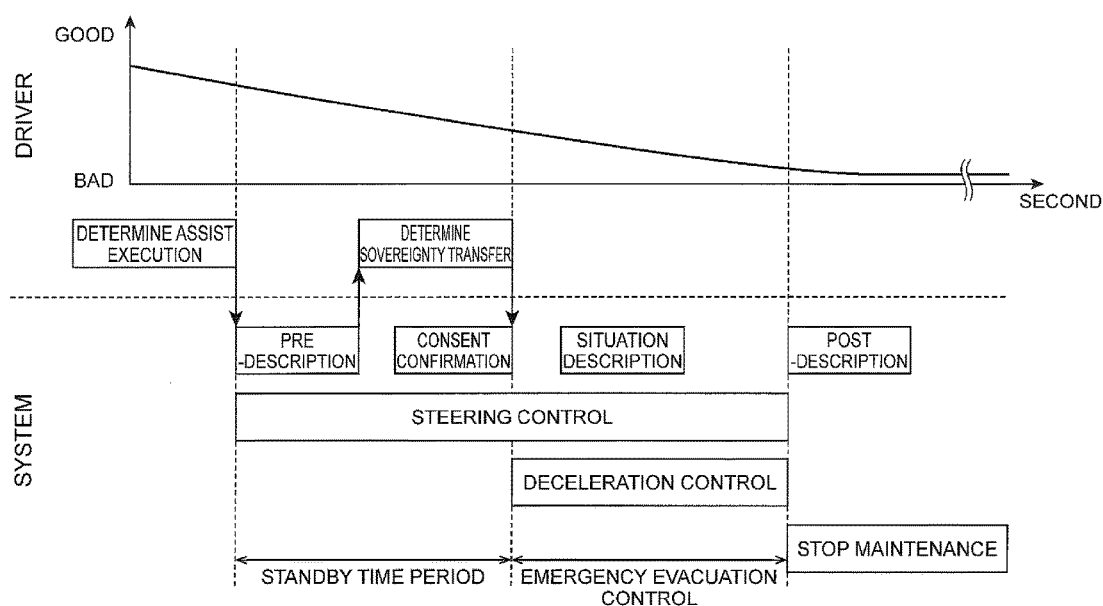
FIG. 2 is a diagram illustrating the flow until an emergency evacuation assist is executed in a drive assist device according to an aspect of the invention.

Next, the defensive driving assist executed in the determination control section 40 will be described in detail. First, for ease of understanding of the control performed by the drive assist device 1, the flow of the control of the drive assist device 1 will be described using FIG. 2. If the drive assist execution is determined by pressing of the switch 33 by the driver, for example, the drive assist device 1 explains to the driver that the emergency evacuation control is to be executed. Then, the driver determines whether to transfer the control of the host vehicle to the device. If the drive assist device 1 confirms the control transfer, the emergency evacuation assist is executed. The determination control section 40 alleviates the condition for executing the defensive driving assist in the standby time period from the time when the driver determines the execution of the drive assist to the time when the consent of the driver is confirmed.

In the standby time period, the erroneous operation determination section 42 determines whether the operation of the driver is an erroneous operation using the determination map show in FIG. 3. The determination map shown in FIG. 3 is stored in a predetermined storage unit in the drive assist device 1 in advance, and becomes a reference for determining whether the operation of the driver is an erroneous operation from the point of view that the driving operation of the driver is unnatural, dangerous, or causes danger to the surrounding peripheral environment or the like. As shown in FIG. 3, the determination map stores the traveling position of the host vehicle, the driving operation of the driver, and information indicating whether the driving operation at the traveling position is suitable, in association with each other. In the determination map shown in FIG. 3, "◯" represents an appropriate operation, and "X" represents an inappropriate operation. Further, "Δ" represents that there is a possibility of inappropriate operation. For example, generally, since it is difficult to consider that the driver would operate a parking brake or a shift lever of an automatic car in an intersection, the operation of the "parking brake" in the "intersection" is associated as an erroneous operation in the determination map. Further, since it is dangerous to perform an operation of releasing the drive assist (for example, PCS 62 or VSC 64) for securing safety of the host vehicle in the standby time period when there is a possibility that the driver is losing consciousness, an operation of turning off the switch of the driving assist is associated as an erroneous operation in the determination map.

When determining whether the operation of the driver is an erroneous operation, the erroneous operation determination section 42 acquires information indicating which one of position of the intersection, the vicinity of the intersection (for example, position up to 30 m before and after the intersection), and a road section of uninterrupted flow the host vehicle is traveling in based on the environmental information output from the environmental information acquisition unit 10. The road section of uninterrupted flow represents a traveling position excluding the intersection and the vicinity of the intersection. The erroneous operation determination section 42 acquires the traveling position of the host vehicle from the environmental information, and acquires the driving operation of the driver from the traveling information. Further, the erroneous operation determination section 42 determines whether the operation of the driver is an erroneous operation based on the obtained traveling position of the host vehicle and the obtained driving operation of the driver, with reference to the determination map. If it is determined that the driving operation of the driver is an erroneous operation (that is, when the driver performs the operation corresponding to "X" in the determination map), and if it is determined that there is a possibility of an erroneous operation (that is, when the driver performs the operation corresponding to "Δ" in the determination map), the erroneous operation determination section 42 outputs a control prohibition signal for prohibiting the driving operation to the control section 44. Only when it is determined that the driving operation of the driver is an erroneous operation, may the control prohibition signal be output to the control section 44.

When receiving the control prohibition signal from the erroneous operation determination section 42, the control section 44 ignores the erroneous operation of the driver so that the erroneous operation is not executed. That is, when the operation of the driver is an erroneous operation, the control section 44 prohibits overriding by the driver. For example, when the driver pulls the parking brake in the intersection in the standby time period, it is determined that the operation is an erroneous operation, and the braking operation using the parking brake is not executed by the control section 44. On the other hand, when it is determined that the operation of the driver is not an erroneous operation by the erroneous operation determination section 42 and the control prohibition signal is not received from the erroneous operation determination section 42, the control section 44 executes the operation of the driver.

The erroneous operation determination section 42 may determine that the operation of the driver is an erroneous operation by the following method. That is, when a temporal change of the steering angle of steering performed by the user is equal to or greater than a predetermined value in the standby time period, the erroneous operation determination section 42 may determine that the steering operation of the user is an erroneous operation. Further, when a temporal change of throttle opening performed by the driver is equal to or greater than a predetermined value in the standby time period, the erroneous operation determination section 42 may determine that the accelerating operation of the driver is an erroneous operation. In this case, the control section 44 nullifies the steering operation or the accelerating operation determined as an erroneous operation so that the operation is not executed.

Further, the determination control section 40 calculates the degree of risk of traveling based on the environmental information output from the environmental information acquisition unit 10 and the traveling information output from the traveling information acquisition unit 20, and notifies peripheral vehicles of the risk according to the amount of the degree of risk through the control section 90. Here, the degree of risk refers to the degree of risk that the host vehicle collides with an obstacle such as another vehicle, in other words, the level of influence of the operation of the driver on the peripheral vehicles. The risk degree acquisition section 43 of the determination control section 40 calculates a risk degree T using Expression (1). In Expression (1), D represents a driver state level. The driver state level D is a value determined based on the output of the driver state detection unit 30. For example, when the consciousness level of the driver is low, the driver state level D is set to be high. When the consciousness level of the driver cannot be detected, the driver state level D may be set to constantly be 1.

$$T=(Wd \times d + Wk \times k + Wr \times r + Wv \times v) \times D \quad (1)$$

Here, parameters and factors are as follows:
d: distance parameter determined based on distance between host vehicle and intersection
k: obstacle parameter determined based on region where obstacle is present
r: proximity level parameter determined based on proximity level between host vehicle and obstacle
v: relative speed parameter determined based on relative speed between host vehicle and obstacle
  Wd: weighting factor of distance parameter d
  Wk: weighting factor of obstacle parameter k
  Wr: weighting factor of proximity level parameter r
  Wv: weighting factor of relative speed parameter v The distance parameter d and the relative speed parameter v in Expression (1) are values that are primarily acquired from the output of the environmental information acquisition unit 10. That is, as the host vehicle becomes closer to the intersection, the distance parameter d is set to be larger, and consequently, the calculated risk degree T becomes a larger value. Further, as the relative speed between the host vehicle and the obstacle becomes higher, the relative speed parameter v is set to be larger, and consequently, the calculated risk degree T becomes a larger value.

Hereinafter, a method for calculating the proximity level parameter r and the obstacle parameter k will be described using a specific example. FIG. 4(a) is a diagram illustrating a case where a vehicle V0 provided with the drive assist device 1 is traveling toward an intersection crossed by a pedestrian P. The proximity level parameter r is calculated using a TTC-TTV map shown in FIG. 5. The time-to-collision (TTC) refers to a prediction time until the vehicle V0 arrives at a traffic lane of the pedestrian P, and the time-to-vehicle (TTV) refers to a prediction time until the person arrives at a traffic lane of the vehicle.

Figure 5:
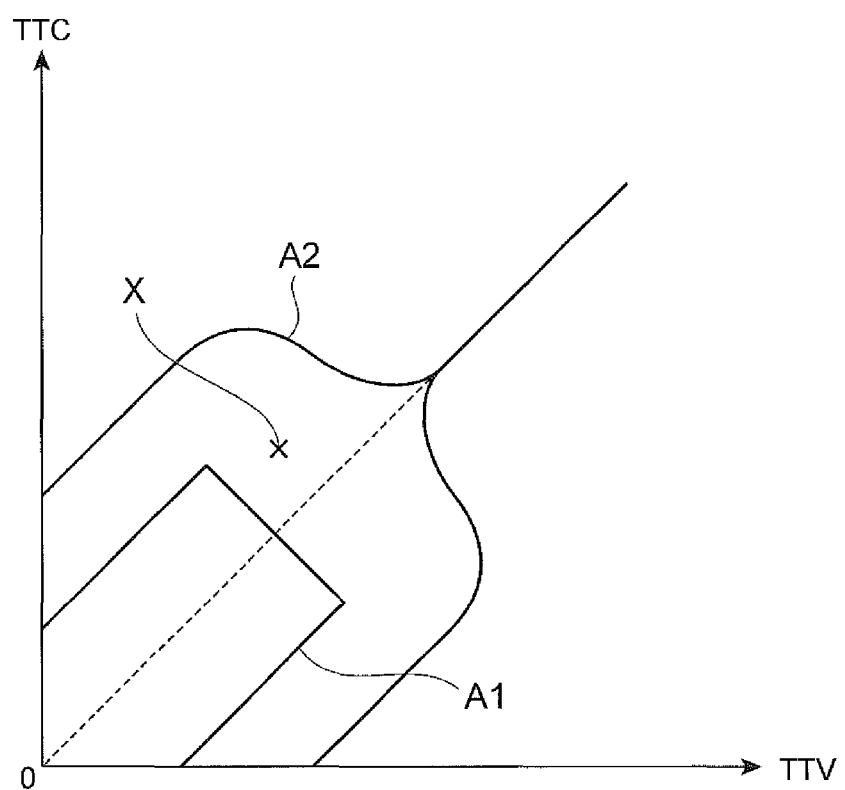
FIG. 5 is a diagram illustrating an example of a TTC-TTV map.

The risk degree acquisition section 43 plots the TTC and the TTV acquired from the output of the environmental information acquisition unit 10 in the map shown in FIG. 5, and sets the proximity level parameter r so that the proximity level parameter r increases as the plotted position X becomes closer to the origin 0. This is because the vehicle V0 and the pedestrian P are higher likely to collide with each other as the position X becomes closer to the origin 0. In other words, the proximity level parameter r is determined by a separation condition of interference lines A1 and A2 to be described later. At normal times, when the plotted position X is inside the predetermined interference line A1, the control section 44 determines that there is a possibility that the person collides with the vehicle, and performs the collision avoidance control. On the other hand, in the standby time period, since there is a possibility that the vehicle V0 deviates from a traveling path predicted at normal times, the control section 44 alleviates a reference start condition for performing the collision avoidance control by changing the interference line A1 to the interference line A2.

As shown in FIG. 4(b), in a case where the host vehicle V0 is traveling toward an intersection that a vehicle V1 enters, similarly, the risk degree acquisition section 43 may calculate the TTC of the vehicle V0 and the TTV of the vehicle V1, and calculate the proximity level parameter r using the TTC-TTV map shown in FIG. 5.

Figure 6:
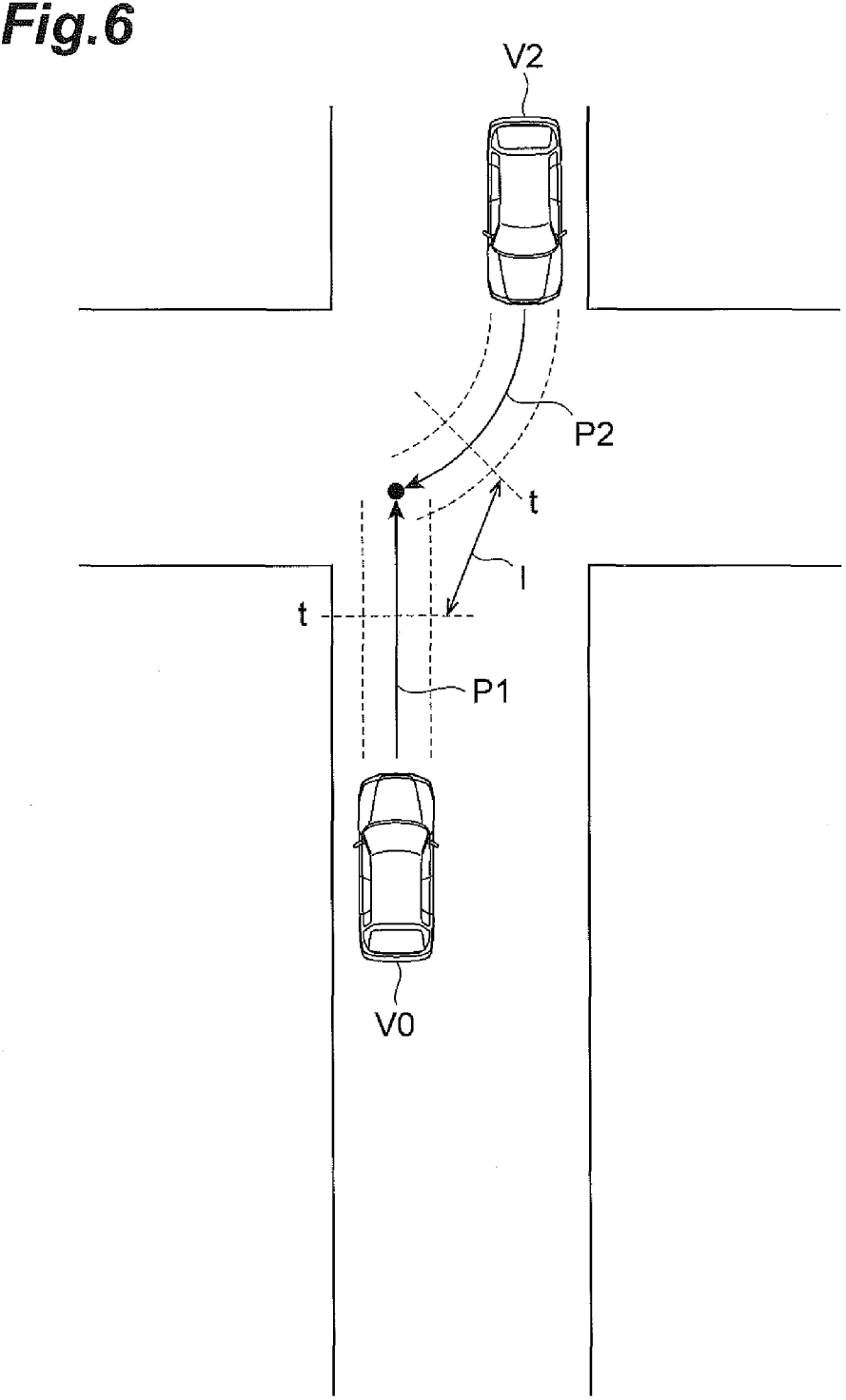
FIG. 6 is a diagram illustrating an example of another calculation method of the proximity degree parameter r.

Next, another method for calculating the proximity level parameter r will be described. FIG. 6 is a diagram illustrating a case where the host vehicle V0 is traveling toward an intersection where a right-turning vehicle V2 is present. In this case, the risk degree acquisition section 43 calculates the relative speed v of the vehicle V0 and the right-turning vehicle V2 based on the environmental information and the traveling information, and estimates a future traveling path P1 of the vehicle V0 and a future traveling path P2 of the right-turning vehicle V2. In addition, the risk degree acquisition section 43 calculates a future relative distance l when the vehicle V0 will be closest to the vehicle V2 from the traveling path P1 and the traveling path P2. Then, the proximity level parameter r is calculated from the following Expression (2) by the risk degree acquisition section 43.

$$r=v/l \qquad (2)$$

Figure 7:
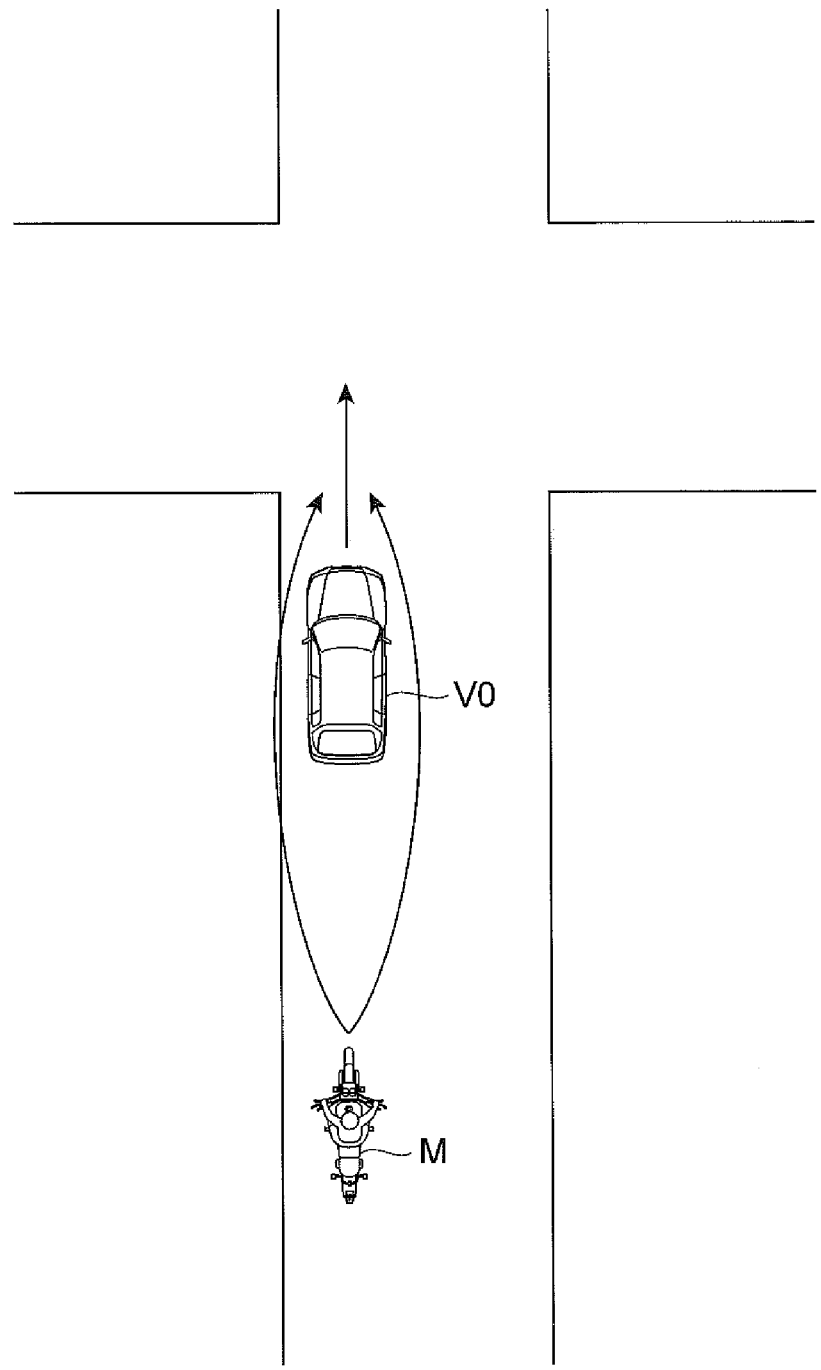
FIG. 7 is a diagram illustrating an example of still another calculation method of the proximity degree parameter r.

The method for calculating the proximity level parameter r using Expression (2) may be applied to a case where a two-wheeled vehicle M overtakes the vehicle V0, as shown in FIG. 7. That is, the risk degree acquisition section 43 acquires the relative speed v between the vehicle V0 and the two-wheeled vehicle M, and the distance l when the vehicle V0 is closest to the two-wheeled vehicle M, and calculates the proximity level parameter r from the above-mentioned Expression (2).

The method for calculating the proximity level parameter r using Expression (2) may be applied to a case where a vehicle V3 moves in front of the vehicle V0 in the vicinity of the intersection, as shown in FIG. 8(a), or a case where the vehicle V0 passes a parked vehicle V4, as shown in FIG. 8(b). That is, the risk degree acquisition section 43 calculates the relative speed v between the vehicle V0 and the vehicle V3 or V4, and the distance l when the vehicle V0 is closest to the vehicle V3 or V4, and calculates the proximity level parameter r from the above-mentioned Expression (2).

Next, a method for calculating the obstacle parameter k will be described. The obstacle parameter k is a value determined based on a region where an obstacle is present. The risk degree acquisition section 43 detects which one of "right front", "right", "right rear", "rear", "left rear", "left", "left front", and "front" with reference to the host vehicle V0 the present position of the obstacle is, and allocates factors k1 to k8 to the obstacles that are present in the "right front", "right", "right rear", "rear", "left rear", "left", "left front", and "front", respectively. Then, the risk degree acquisition section 43 calculates the obstacle parameter k based on the sum of the factors k1 to k8 allocated to the detected obstacles. The factors k1 to k8 may be set as arbitrary values. For example, since it is considered that an obstacle that is present in front of the host vehicle V0 has a high collision probability in the future, compared with an obstacle that is present at the rear thereof, the factor k8 may be set as a value larger than that of the factor k4.

The method for calculating the obstacle parameter k will be described using a specific example. FIG. 9 is a diagram illustrating a case where the vehicle V0 enters an intersection where vehicles V5 to V7 are present. At a time point t0, as shown in FIG. 9(a), the vehicle V0 travels in front of the intersection. In this case, the factor k1 is allocated to the vehicle V5 that is present in the right front of the vehicle V0, and the factor k8 is allocated to the vehicle V6 that is present in front of the vehicle V0. Further, the factor k7 is allocated to the vehicle V7 that is present in the left front of the vehicle V0. Thus, the obstacle parameter k at the time point t0 becomes k1+k8+k7.

At a time point t1 after the time point t0, as shown in FIG. 9(b), the vehicle V0 travels in the intersection. In this case, the factor k2 is allocated to the vehicle V5 that is present on the right side of the vehicle V0, and the factor k8 is allocated to the vehicle V6 that is present in front of the vehicle V0. Further, the factor k6 is allocated to the vehicle V7 that is present on the left side of the vehicle V0. Thus, the obstacle parameter k at the time point t1 becomes k2+k8+k6.

At a time point t2 after the time point t1, as shown in FIG. 9(c), the vehicle V0 deviates extremely from the traveling lane in order to exit the intersection. In this case, the factor k3 is allocated to the vehicle V5 that is present in the right rear of the vehicle V0, and the factor k7 is allocated to the vehicle V6 that is present in the left front of the vehicle V0. Further, the factor k5 is allocated to the vehicle V7 that is present in the left rear of the vehicle V0. Further, at the time point t2, since a wall W that is an obstacle is present close in front of the vehicle V0 at the position deviated from the road, the factor k8 is allocated to the wall W. Thus, the obstacle parameter k at the time point t2 becomes k3+k7+k5+k8.

In the above example, the method for calculating the obstacle parameter k when the vehicle V0 enters the intersection is described, but the obstacle parameter k may be calculated when the host vehicle travels in the vicinity of the intersection or on the road section of uninterrupted flow using the similar method.

Further, when the host vehicle travels in the intersection, the risk degree acquisition section 43 may set the risk degree T to be high, compared with a case where the host vehicle travels in the vicinity of the intersection or on the road section of uninterrupted flow. In addition, when the host vehicle travels in the vicinity of the intersection, the risk degree acquisition section 43 may set the risk degree T to be high, compared with a case where the host vehicle travels on the road with uninterrupted flow.

The risk degree T is calculated by Expression (1), using the parameters d, k, r and v calculated as in the above example. The control section 44 notifies vehicles around the host vehicle of the danger at different notification levels according to the size of the risk degree T. An example of the notification level of the control section 44 will be described with reference to FIG. 10. When the risk degree T is larger than a first threshold value and is smaller than a second threshold value that is larger than the first threshold value (degree of risk "small" in FIG. 10), the control section 44 determines that the risk degree T is at a level where the host vehicle affects only a specific target among targets that are vehicles around the host vehicle and a position is necessary so as not to be close to the target (that is, at a level with low emergency), and performs the notification of the danger toward the rear or the rear lateral side by flickering a brake lamp, for example.

When the risk degree T is larger than the second threshold value and is equal to or smaller than a third threshold value larger than the second threshold value (degree of risk "intermediate" in FIG. 10), the control section 44 determines that the risk degree T is at a level that affects limited targets among targets that are vehicles around the host vehicle and that the avoidance is necessary (that is, at a level of emergency to some extent), and performs the notification of the danger in directions where the targets to be affected are present. For example, when the targets are present in front of or at the rear of the host vehicle, the control section 44 flickers the hazard lamp and the brake lamp. When the target is an oncoming vehicle, the control section 44 flickers a high beam. In addition, when the target is present on the opposite lane of the intersection, the control section 44 performs the notification of the danger by flickering a rotating lamp or using the horn.

When the risk degree T is larger than the third threshold value (degree of risk "large" in FIG. 10), the control section 44 determines that the risk degree T is at a level where the host vehicle affects unspecified targets and that the emergency avoidance is necessary (that is, at a level with extremely high emergency), and performs the notification of the danger in all directions. For example, the control section 44 notifies the peripheral vehicles of the danger by flickering the rotating lamp and using the horn. Further, the control section 44 may flicker the hazard lamp and the brake lamp. The flickering of both the hazard lamp and the brake lamp is for preventing confusion of the behavior of flickering the hazard lamp and not transmitting the intention of thanks to peripheral vehicles. When the risk degree T is equal to or smaller than the first threshold value, the control section 44 does not notify the peripheral vehicles of the danger. As described above, as the calculated risk degree T becomes larger, a higher notification level is set. The danger notification is performed so as to be noticeable to the peripheral vehicles by the notification unit 90 as the notification level becomes high. Further, when the consciousness level of the driver is low, since the driver state level D is set to be large, the danger notification is performed so as to be noticeable to the peripheral vehicles by the notification unit 90.

When the degree of risk acquired by the risk degree acquisition section 43 is higher than a predetermined degree of risk, the control section 44 may nullify a part of the driving operation. This is because when the degree of risk is low, it is considered that the necessity of nullifying the driving operation of the driver is low.

Figure 11:
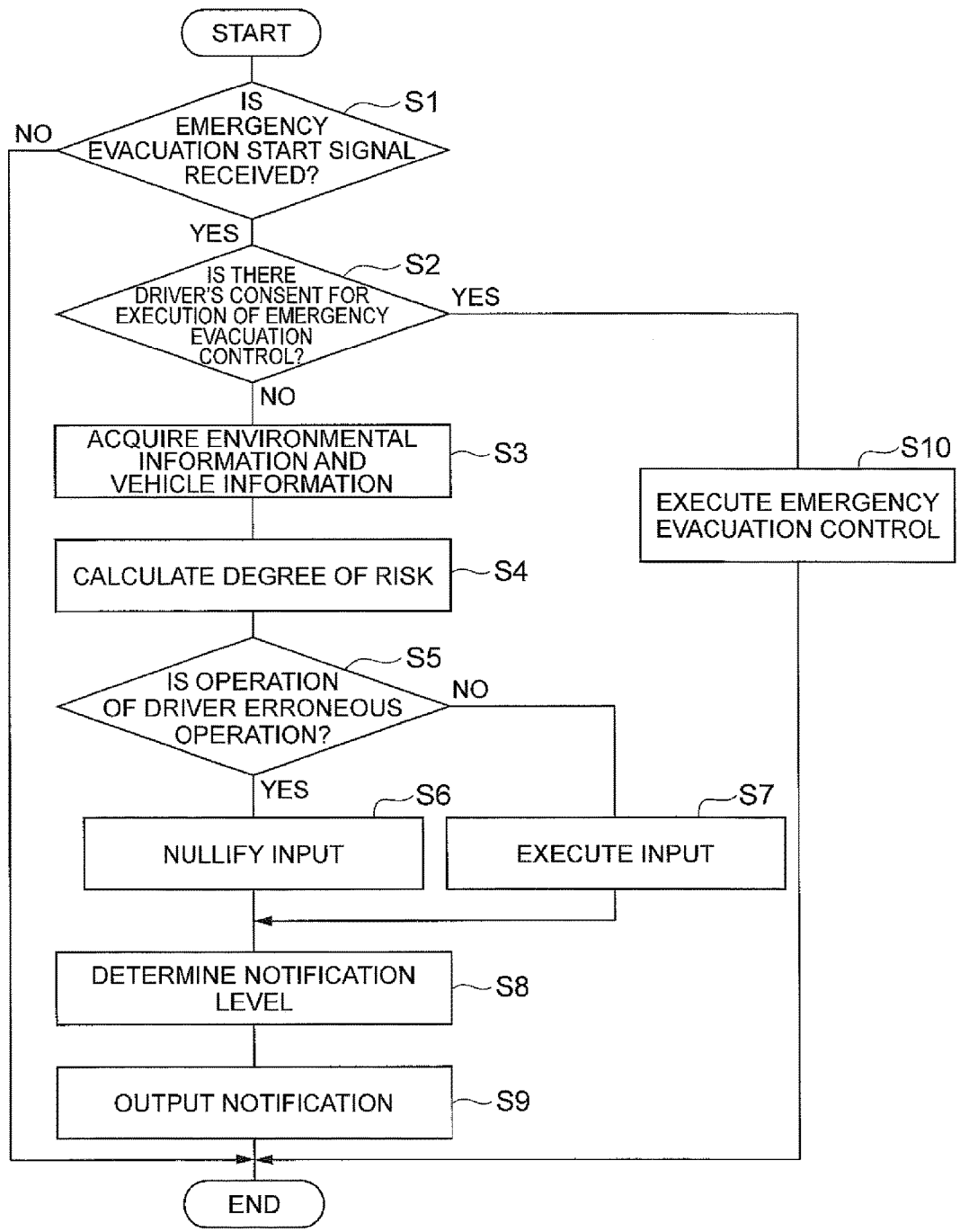
FIG. 11 is a flowchart illustrating an operation of a drive assist device of a first embodiment.

Next, the operation of the drive assist device 1 according to the present embodiment will be described. FIG. 11 is a flowchart illustrating the operation of the drive assist device 1 according to the present embodiment. The process shown in FIG. 11 is repeatedly executed at a predetermined interval from the timing when the power of the drive assist device 1 is turned on, for example.

First, the determination control section 40 of the drive assist device 1 determines whether the emergency evacuation start signal is received from the driver state detection unit 30 (S1). If it is determined that the emergency evacuation start signal is not received (No in S1), the process is ended. If it is determined that the emergency evacuation start signal is received (Yes in S1), the consent confirmation section 41 of the determination control section 40 inquires whether the driver consents to the execution of the emergency evacuation control. If a reply indicating the driver's consent of the execution of the emergency evacuation control is acquired from the driver with respect to the inquiry (Yes in S2), the emergency evacuation control is executed (S10), and then, the process is ended. On the other hand, if the reply indicating the driver's consent of the execution of the emergency evacuation control is not acquired from the driver with respect to the inquiry (No in S2), the determination control section 40 acquires environmental information and traveling information from the environmental information acquisition unit 10 and the traveling information acquisition unit 20 (S3). Then, the risk degree acquisition section 43 calculates the parameters d, k, r, and v using the environmental information and the traveling information, and calculates the risk degree T from the parameters and the driver state level D (S4).

Subsequently, the erroneous operation determination section 42 acquires information indicating which one of the intersection, the vicinity of the intersection, and the road section of uninterrupted flow the host vehicle travels from the environmental information, and determines whether the operation of the driver is an erroneous operation using the determination map shown in FIG. 3 (S5). If it is determined that the operation of the driver is an erroneous operation (Yes in S5), the input is nullified (S6). That is, the operation of the driver is nullified. On the other hand, if it is determined that the operation of the driver is not an erroneous operation (No in S5), the input is executed (S7).

Then, the risk degree acquisition section 43 determines a notification level from the risk degree T calculated in step S4 (S8). Then, as shown in FIG. 10, the control section 44 performs a notification output of the notification level corresponding to the degree of risk (S9). After the control section 44 performs the notification output, a series of drive assist processes is ended.

In the above-described drive assist device 1, in the period from the time when the emergency evacuation start signal is received by the driver state detection unit 30 to the time when the consent reply of the execution of the control is received by the consent confirmation section 41, the conditions for executing the defensive driving assist for avoiding the traveling risk of the vehicle are alleviated, and thus, the defensive driving assist is easily executed. Accordingly, in the period from the time when the emergency evacuation start signal is received to the time when the consent of the driver is acquired, the behavior of the vehicle due to an erroneous operation of the driver or the like can be prevented from causing uneasiness in drivers of peripheral vehicles.

Second Embodiment

Next, a second embodiment of the invention will be described. A drive assist device 1 according to the second embodiment has approximately the same configuration as that of the drive assist device 1 according to the first embodiment, but is different therefrom in conditions for executing the defensive driving assist determined in the determination control section 40 and the content of the defensive driving assist. Hereinafter, for ease of understanding, the different points from the drive assist device 1 according to the first embodiment will be mainly described, and repetitive description will be omitted.

In the drive assist device 1 of the present embodiment, the erroneous operation determination section 42 determines whether the operation or the release of the drive assist using the drive assist unit 60 performed by the driver is an erroneous operation. If it is determined by the erroneous operation determination section 42 that the operation or the release of the drive assist using the drive assist unit 60 performed by the driver is an erroneous operation, the control section 44 nullifies the operation or the release of the drive assist performed by the driver. Hereinafter, the operation of the determination control section 40 will be described using a specific drive assist.

If the driver turns on (operates) the ACC 61 in the standby time period, the erroneous operation determination section 42 determines that the operation is an erroneous operation. When it is necessary to stop the host vehicle due to the decline in consciousness or the like of the driver, if the ACC 61 is operated, the host vehicle may follow the preceding vehicle when the preceding vehicle is accelerated or deviates from the lane, or the setting vehicle speed may increase, so that the host vehicle may be accelerated, which is inappropriate.

Figure 12:
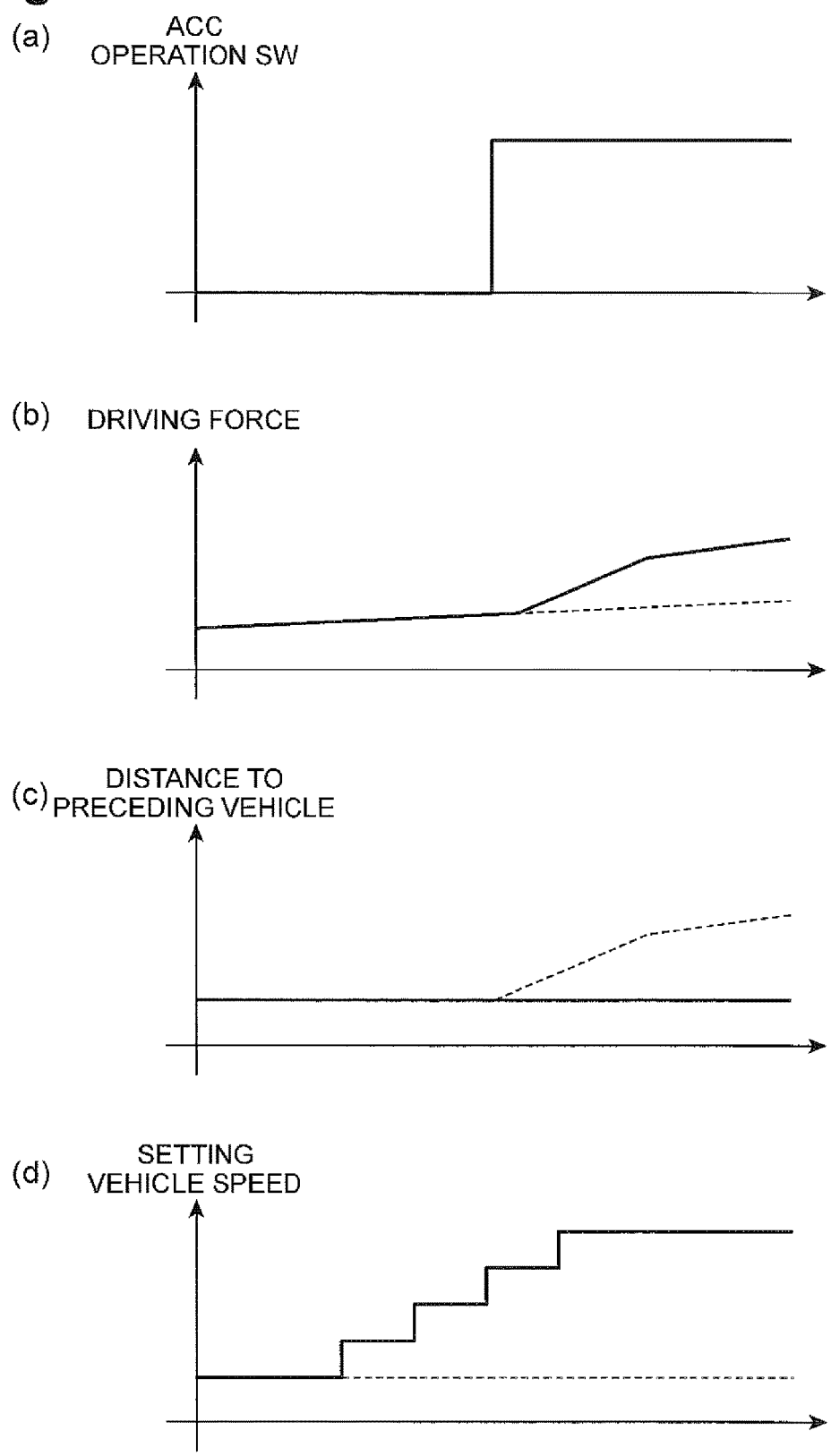
FIG. 12 is a diagram illustrating the driving force of a host vehicle, the distance to a preceding vehicle, and the change in a setting vehicle speed when the operation of an ACC is permitted, and the driving force of the host vehicle, the distance to the preceding vehicle, and the change in the setting speed when the operation of the ACC is nullified.

FIG. 12(a) shows a timing when an operating switch of the ACC 61 is turned on. FIG. 12(b) is a diagram illustrating change in driving force of the host vehicle when the operation of the ACC 61 is permitted, and change in the driving force of the host vehicle when the operation is nullified, when the operation of the ACC 61 is performed when the preceding vehicle is accelerated. In FIG. 12(b), the change in the driving force of the host vehicle when the operation of the ACC 61 is permitted is indicated by a solid line, and the change in the driving force of the host vehicle when the ACC operation is nullified is indicated by a dashed line. As shown in FIG. 12(b), if the operation of the ACC 61 is permitted, the constant speed traveling control device or the vehicle-to-vehicle distance control is executed to increase the driving force. On the other hand, if the operation of the ACC 61 is nullified, the driving force is constantly maintained.

FIG. 12(c) is a diagram illustrating, when the ACC operation is performed when the preceding vehicle is accelerated, a change in a distance to the preceding vehicle when the operation is permitted, and a change in the distance to the preceding vehicle when the operation is nullified. In FIG. 12(c), the change in the distance to the preceding vehicle when the ACC operation is permitted is indicated by a solid line, and the change in the distance to the preceding vehicle when the operation is nullified is indicated by a dashed line. As shown in FIG. 12(c), if the ACC operation is permitted, the vehicle-to-vehicle distance control is executed to maintain the vehicle-to-vehicle distance at the preceding vehicle. On the other hand, if the ACC operation is nullified, the host vehicle reduces the speed and the vehicle-to-vehicle to the preceding vehicle increases. Further, similarly, when the constant speed traveling control is executed by the ACC operation, the host vehicle may be accelerated to reduce the vehicle-to-vehicle distance to the preceding vehicle.

FIG. 12(d) is a diagram illustrating, when the ACC operation is performed, change in the driving force of the host vehicle when the operation is permitted, and change in the driving force of the host vehicle when the operation is nullified. In FIG. 12(d), the change in the driving force of the host vehicle when the ACC operation is permitted is indicated by a solid line, and the change in the driving force of the host vehicle when the operation is nullified is indicated by a dashed line. As shown in FIG. 12(d), if the ACC operation is permitted, the constant speed traveling control or the vehicle-to-vehicle distance control is executed to increase the setting vehicle speed in stages. On the other hand, if the ACC operation is nullified, the setting vehicle speed is constantly maintained.

When the driver turns on (operates) the LKA 63 in the standby time period, the erroneous operation determination section 42 determines that the operation is an erroneous operation. When it is necessary to stop the host vehicle due to the decline in consciousness of the driver or the like, if the LKA 63 is operated, the vehicle continues to travel, which is inappropriate.

FIG. 13(a) shows the timing when an operating switch of the LKA 63 is turned on. FIG. 13(b) shows the change in a curve radius. FIG. 13(c) is a diagram illustrating, when the operation of the LKA 63 is performed, a change in torque of the host vehicle when the operation is permitted, and a change in the torque of the host vehicle when the operation is nullified. In FIG. 13(c), the change in the torque of the host vehicle when the operation of the LKA 63 is permitted is indicated by a solid line, and the change in the torque of the host vehicle when the operation of the LKA 63 is nullified is indicated by a dashed line. As shown in FIG. 13(b), if the operation of the LKA 63 is permitted, the assigned torque decreases. On the other hand, if the LKA operation is nullified, the assigned torque is constantly maintained.

FIG. 13(d) is a diagram illustrating, when the operation of the LKA 63 is operated, a change in a yaw rate of the host vehicle when the operation is permitted, and a change in the yaw rate of the host vehicle when the operation is nullified. In FIG. 13(d), the change in the yaw rate of the host vehicle when the operation of the LKA 63 is permitted is indicated by a solid line, and the change in the yaw rate of the host vehicle when the LKA operation is nullified is indicated by a dashed line. As shown in FIG. 13(d), if the operation of the LKA 63 is permitted, the lane keeping assist control is executed to increase the yaw rate. On the other hand, if the LKA operation is nullified, the lane keeping assist control is not executed, and the yaw rate is constantly maintained.

When the driver turns off (releases) the VSC 64 in the standby time period, the erroneous operation determination section 42 determines that the release is an erroneous operation. This is because when there is a possibility that the host vehicle slips due to the consciousness decline or the like of the driver, the release of the VSC 64 is inappropriate.

FIG. 14(a) shows the timing when an operating switch of the VSC 64 is turned off. FIG. 14(b) shows a change in a curve radius. FIG. 14(c) is a diagram illustrating, when the release operation of the VSC 64 is performed, a change in lateral acceleration of the host vehicle when the release operation is permitted, and a change in the lateral acceleration of the host vehicle when the release operation is nullified. In FIG. 14(c), the change in the lateral acceleration of the host vehicle when the release operation of the VSC 64 is permitted is indicated by a solid line, and the change in the lateral acceleration of the host vehicle when the release operation of the VSC 64 is nullified is indicated by a dashed line. As shown in FIG. 14(c), if the release operation of the VSC 64 is permitted to stop the sideslip prevention control due to the VSC 64, the lateral acceleration increases. On the other hand, if the release operation of the VSC 64 is nullified, the sideslip prevention control is executed to suppress an increase in the lateral acceleration.

FIG. 14(d) is a diagram illustrating, when the release operation of the VSC 64 is performed, a change in the yaw rate of the host vehicle when the release operation is permitted, and a change in the yaw rate of the host vehicle when the release operation is nullified. In FIG. 14(d), the change in the yaw rate of the host vehicle when the release operation of the VSC 64 is permitted is indicated by a solid line, and the change in the yaw rate of the host vehicle when the release operation of the VSC is nullified is indicated by a dashed line. As shown in FIG. 14(d), if the release operation of the VSC 64 is permitted to stop the sideslip prevention control due to the VSC 64, the yaw rate increases. On the other hand, if the release operation of the VSC 64 is nullified, the sideslip prevention control is executed to suppress an increase in the yaw rate.

Further, when the driver turns off (releases) the PCS 62 in the standby time period, the erroneous operation determination section 42 determines that the release is an erroneous operation. This is because since there is a possibility that the host vehicle collides with an obstacle due to deceleration of a preceding vehicle or interruption of another vehicle, for example, the release of the PCS 62 during the decline in consciousness of the driver is inappropriate.

Figure 15:
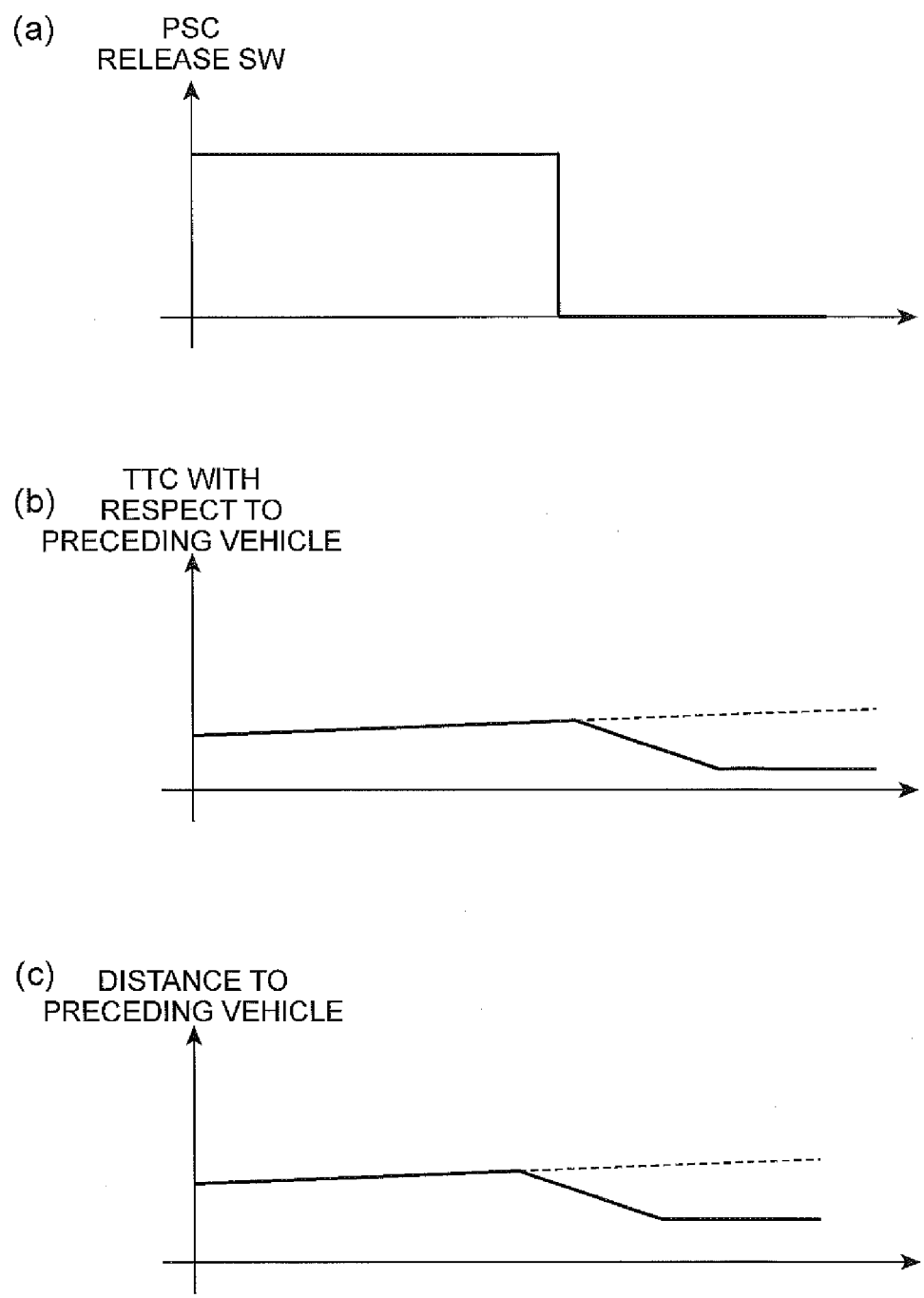
FIG. 15 is a diagram illustrating change in a TTC of a host vehicle with respect to a preceding vehicle and the distance to the preceding vehicle when a release operation of PCS is permitted, and change in the driving force of the host vehicle when the release operation of the PCS is nullified.

FIG. 15(a) shows the timing when an operating switch of the PCS 62 is turned on. FIG. 15(b) is a diagram illustrating, when the release operation of the PCS 62 is performed, a change in a TTC with respect to a preceding vehicle when the release operation is permitted, and a change in the TTC with respect to the preceding vehicle when the operation is nullified. In FIG. 15(b), the change in the TTC with respect to the preceding vehicle when the release operation of the PCS 62 is permitted is indicated by a solid line, and the change in the TTC with respect to the preceding vehicle when the operation of the PCS 62 is nullified is indicated by a dashed line. As shown in FIG. 15(b), if the release operation of the PCS 62 is permitted to stop the collision avoidance assist due to the PCS 62, the TTC with respect to the preceding vehicle decreases. On the other hand, if the release operation of the PCS 62 is nullified, the collision avoidance assist is executed to suppress a decrease in the TTC with respect to the preceding vehicle.

FIG. 15(c) is a diagram illustrating, when the release operation of the PCS 62 is performed, a change in a distance to a preceding vehicle when the release operation is permitted, and a change in the distance to the preceding vehicle when the release operation is nullified. In FIG. 14(c), the change in the distance to the preceding vehicle when the release operation of the PCS 62 is permitted is indicated by a solid line, and the change in the distance to the preceding vehicle when the release operation of the PCS 62 is nullified is indicated by a dashed line. As shown in FIG. 14(c), if the release operation of the PCS 62 is permitted to stop the collision avoidance assist due to the PCS 62, the distance to the preceding vehicle decreases. On the other hand, if the release operation of the PCS 62 is nullified, the collision avoidance assist is executed to suppress a decrease in the distance to the preceding vehicle.

Only when the risk degree acquired by the risk degree acquisition section 43 is higher than a predetermined value, may the control section 44 nullify the release operation of the PCS 62 or the VSC 64 in the standby time period. This is because it is considered that when the risk degree is low, the necessity for nullifying the release operation of the PCS 62 or the VCS 64 of the driver is low.

According to the above-described drive assist device, since it is determined whether the operation or the release of the drive assist performed by the driver is an erroneous operation, the operation or the release of a dangerous drive assist can be detected. Further, when it is determined that the operation or the release of the drive assist using the drive assist unit 60 performed by the driver is an erroneous operation, the control section 44 nullifies the operation or the release of the drive assist performed by the driver. Thus, according to the drive assist device, the operation or the release of the dangerous drive assist can be prevented.

Third Embodiment

Next, a third embodiment of the invention will be described. A drive assist device 1 according to the third embodiment has approximately the same configuration as that of the drive assist device 1 according to the first and second embodiments, but is different therefrom in conditions for executing the defensive driving assist determined in the determination control section 40 and the content of the defensive driving assist. Hereinafter, for ease of understanding, the different points from the drive assist device 1 according to the first and second embodiments will be mainly described, and repetitive description will be omitted.

In the drive assist device 1 of the present embodiment, the erroneous operation determination section 42 determines whether a shift operation of the driver is an erroneous operation. If it is determined by the erroneous operation determination section 42 that the shift operation of the driver is an erroneous operation, the control section 44 nullifies the shift operation of the driver.

In the drive assist device 1 of the present embodiment, when the host vehicle is stopped (that is, when the vehicle speed is 0) in the standby time period, the erroneous operation determination section 42 determines that an operation of changing a shift lever to a state other than parking is an erroneous operation. If the shift lever is changed to the state other than parking, the host vehicle may move, which is inappropriate. Further, when the host vehicle is traveling (that is, when the vehicle velocity is higher than 0) in the standby time period, the erroneous operation determination section 42 determines that an operation of changing the shift lever to a state other than traveling is an erroneous operation. This is because if the shift lever is changed to the state other than traveling while the vehicle is traveling, the host vehicle may be suddenly stopped, which causes uneasiness in drivers of peripheral vehicles. Here, traveling refers to a range used for traveling, such as drive, a low range or a second range in an automatic transmission vehicle.

If it is determined by the erroneous operation determination section 42 that the shift operation of the driver is an erroneous operation, the control section 44 nullifies the shift operation of the driver. That is, when the driver performs the operation of changing the shift lever to the state other than parking while the vehicle is stopped in the standby time period, the control section 44 nullifies the operation of changing the shift lever to the state other than parking. Further, when the driver performs the operation of changing the shift lever to the state other than traveling while the vehicle is traveling in the standby time period, the control section 44 nullifies the operation of changing the shift lever to the state other than traveling.

Further, only when the risk degree acquired by the risk degree acquisition section 43 is higher than a predetermined value, may the control section 44 nullify the operation of changing the shift lever to the state other than parking while the vehicle is stopped, and the operation of changing the shift lever to the state other than traveling while the vehicle is traveling, in the standby time period. This is because it is considered that the necessity for nullifying the operation of the driver is low in the case of an erroneous operation having a low degree of risk.

Hereinbefore, the preferred embodiments of the invention are described, but the invention is not limited to the above-described embodiments. For example, in the first and second embodiments, the determination control section 40 includes both the erroneous operation determination section 42 and the risk degree acquisition section 43, but may include any one of the erroneous operation determination section 42 and the risk degree acquisition section 43.

Further, in the above embodiments, when it is determined by the erroneous operation determination section 42 that the driving operation of the driver is an erroneous operation, the control section 44 nullifies the driving operation of the driver, but the control section 44 may limit the driving operation, for example, and may weaken the amount of control of the driving operation.

REFERENCE SIGNS LIST

Further, the drive assist device 1 may use, instead of the PCS 62, a collision avoidance assist device having the same function, and may use, instead of the LKA 63, a lane keeping assist device having the same function. Further, the drive assist device 1 may use, instead of the VSC 64, a sideslide prevention control device having the same function. Further, the drive assist unit 60 may use a drive assist device different from the ACC 61, the PCS 62, the LKA 63, and the VSC 64. For example, the drive assist unit 60 may include a lane deviation warning assist device, and the control section 44 may nullify an operation or a release of the lane deviation warning assist device performed by the driver.

1: Drive assist device
10: Environmental information acquisition unit
20: Traveling information acquisition unit
30: Driver state detection unit
31: Physiological measurement section
32: Visual line and face orientation measurement section
33: Switch
40: Determination control section
41: Consent confirmation section
42: Erroneous operation determination section
43: Risk degree acquisition unit
44: Control section
50: Drive assist HMI
60: Drive assist unit
70: Actuator
80: Drive recorder
90: Notification unit

The invention claimed is:

1. A drive assist device comprising:
a start signal output unit that outputs a control start signal;
a consent confirmation unit that inquires of a driver, when receiving the control start signal from the start signal output unit, whether the driver consents to execution of an emergency evacuation control for stopping a vehicle at a safe position regardless of a driving operation of the driver, and receives a reply to the inquiry from the driver;
a control section that executes the emergency evacuation control when receiving a consent reply of the execution of the emergency evacuation control from the driver by the consent confirmation unit;
an erroneous operation determination unit that determines whether the driving operation of the driver is an erroneous operation,
wherein the control section limits the driving operation of the driver when (i) the consent reply of execution of the control is not received by the consent confirmation unit after a receipt of the control start signal and (ii) it is determined that the driving operation of the driver is an erroneous operation by the erroneous operation determination unit;
a drive assist unit that performs a drive assist for assisting traveling of the vehicle,
wherein the drive assist unit is capable of switching an operation and a release of the drive assist,
the erroneous operation determination unit determines whether the operation of the drive assist by the driver is an erroneous operation, and
the control section nullifies the operation when it is determined that the operation is an erroneous operation by the erroneous operation determination unit,
wherein the drive assist is a constant speed traveling control, and
the erroneous operation determination unit determines that an operation of the constant speed traveling control is an erroneous operation when the operation of the constant speed traveling is performed by the driver in the period from the time when the control start signal is received by the start signal output unit to the time when the consent reply of the execution of the control is received by the consent confirmation unit.

2. A drive assist device comprising:
a start signal output unit that outputs a control start signal;
a consent confirmation unit that inquires of a driver, when receiving the control start signal from the start signal output unit, whether the driver consents to execution of an emergency evacuation control for stopping a vehicle at a safe position regardless of a driving operation of the driver, and receives a reply to the inquiry from the driver;
a control section that executes the emergency evacuation control when receiving a consent reply of the execution of the emergency evacuation control from the driver by the consent confirmation unit;
an erroneous operation determination unit that determines whether the driving operation of the driver is an erroneous operation,
wherein the control section limits the driving operation of the driver when (i) the consent reply of execution of the control is not received by the consent confirmation unit after a receipt of the control start signal and (ii) it is determined that the driving operation of the driver is an erroneous operation by the erroneous operation determination unit;
a drive assist unit that performs a drive assist for assisting traveling of the vehicle,
wherein the drive assist unit is capable of switching an operation and a release of the drive assist,
the erroneous operation determination unit determines whether the operation of the drive assist by the driver is an erroneous operation, and
the control section nullifies the operation when it is determined that the operation is an erroneous operation by the erroneous operation determination unit,
wherein the drive assist is a lane keeping assist control, and
the erroneous operation determination unit determines that an operation of the lane keeping assist control is an erroneous operation when the operation of the lane keeping assist control is performed by the driver in the period from the time when the control start signal is received by the start signal output unit to the time when the consent reply of the execution of the control is received by the consent confirmation unit.

3. A drive assist device comprising:
a start signal output unit that outputs a control start signal;
a consent confirmation unit that inquires of a driver, when receiving the control start signal from the start signal output unit, whether the driver consents to execution of an emergency evacuation control for stopping a vehicle at a safe position regardless of a driving operation of the driver, and receives a reply to the inquiry from the driver;
a control section that executes the emergency evacuation control when receiving a consent reply of the execution of the emergency evacuation control from the driver by the consent confirmation unit;
an erroneous operation determination unit that determines whether the driving operation of the driver is an erroneous operation,
wherein the control section limits the driving operation of the driver when (i) the consent reply of execution of the control is not received by the consent confirmation unit after a receipt of the control start signal and (ii) it is determined that the driving operation of the driver is an erroneous operation by the erroneous operation determination unit; and a drive assist unit that performs a drive assist for assisting traveling of the vehicle, wherein the drive assist unit is capable of switching an operation and a release of the drive assist, the erroneous operation determination unit determines whether the release of the drive assist by the driver is an erroneous operation, and the control section nullifies the release when it is determined that the release is an erroneous operation by the erroneous determination unit.

4. The drive assist device according to claim 3, wherein the control section nullifies the driving operation of the driver when it is determined that the driving operation of the driver is an erroneous operation by the erroneous operation determination unit.

5. The drive assist device according to claim 1, wherein the erroneous operation determination unit determines, when a temporal change of a steering angle of steering performed by the driver is equal to or greater than a predetermined value, that a steering operation of the driver is an erroneous operation.

6. The drive assist device according to claim 2, wherein the erroneous operation determination unit determines, when a temporal change of a steering angle of steering performed by the driver is equal to or greater than a predetermined value, that a steering operation of the driver is an erroneous operation.

7. The drive assist device according to claim 3, wherein the erroneous operation determination unit determines, when a temporal change of a steering angle of steering performed by the driver is equal to or greater than a predetermined value, that a steering operation of the driver is an erroneous operation.

8. The drive assist device according to claim 1, wherein the erroneous operation determination unit determines, when a temporal change of throttle opening performed by the driver is equal to or greater than a predetermined value, that an accelerating operation of the driver is an erroneous operation.

9. The drive assist device according to claim 2, wherein the erroneous operation determination unit determines, when a temporal change of throttle opening performed by the driver is equal to or greater than a predetermined value, that an accelerating operation of the driver is an erroneous operation.

10. The drive assist device according to claim 3, wherein the erroneous operation determination unit determines, when a temporal change of throttle opening performed by the driver is equal to or greater than a predetermined value, that an accelerating operation of the driver is an erroneous operation.

11. The drive assist device according to claim 1, wherein the erroneous operation determination unit determines that an operation of changing a shift lever to a state other than parking while the vehicle is stopped is an erroneous operation.

12. The drive assist device according to claim 2, wherein the erroneous operation determination unit determines that an operation of changing a shift lever to a state other than parking while the vehicle is stopped is an erroneous operation.

13. The drive assist device according to claim 3, wherein the erroneous operation determination unit determines that an operation of changing a shift lever to a state other than parking while the vehicle is stopped is an erroneous operation.

14. The drive assist device according to claim 1, wherein the erroneous operation determination unit determines that an operation of changing a shift lever to a state other than traveling while the vehicle is traveling is an erroneous operation.

15. The drive assist device according to claim 2, wherein the erroneous operation determination unit determines that an operation of changing a shift lever to a state other than traveling while the vehicle is traveling is an erroneous operation.

16. The drive assist device according to claim 3, wherein the erroneous operation determination unit determines that an operation of changing a shift lever to a state other than traveling while the vehicle is traveling is an erroneous operation.

17. The drive assist device according to claim 1, further comprising:

a traveling information acquisition unit that acquires traveling information of the vehicle;

an environmental information acquisition unit that acquires environmental information relating to a peripheral environment of the vehicle; and a risk degree acquisition unit that acquires the degree of risk of colliding with an obstacle based on at least one of the traveling information and the environmental information, wherein the control section nullifies a part of the driving operation when the degree of risk is higher than a predetermined value.

* * * * *